(12) United States Patent
Mironets et al.

(10) Patent No.: US 11,679,439 B2
(45) Date of Patent: Jun. 20, 2023

(54) SYSTEMS AND METHODS FOR DIRECT DEPOSITION OF THIXOTROPIC ALLOYS

(71) Applicant: GOODRICH CORPORATION, Charlotte, NC (US)

(72) Inventors: Sergey Mironets, Charlotte, NC (US); Thomas J. Martin, East Hampton, CT (US); Alexander Staroselsky, Avon, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/396,617

(22) Filed: Aug. 6, 2021

(65) Prior Publication Data

US 2023/0039985 A1     Feb. 9, 2023

(51) Int. Cl.
  *B22F 10/22*     (2021.01)
  *B33Y 10/00*     (2015.01)
  *B33Y 40/10*     (2020.01)
  *B33Y 70/00*     (2020.01)
  *B22F 7/02*      (2006.01)
  *B22F 12/13*     (2021.01)
  *B22F 12/53*     (2021.01)
  *B22F 12/58*     (2021.01)
  (Continued)

(52) U.S. Cl.
  CPC ............... *B22F 10/22* (2021.01); *B22F 7/02* (2013.01); *B22F 12/13* (2021.01); *B22F 12/53* (2021.01); *B22F 12/58* (2021.01); *B22F 12/70* (2021.01); *B23K 20/1215* (2013.01); *B33Y 10/00* (2014.12); *B33Y 30/00* (2014.12); *B33Y 40/10* (2020.01); *B33Y 70/00* (2014.12); *B22F 2201/10* (2013.01)

(58) Field of Classification Search
  CPC ....................................................... B22F 10/22
  See application file for complete search history.

(56) References Cited

U.S. PATENT DOCUMENTS

2017/0252830 A1     9/2017   Sachs et al.
2017/0274454 A1     9/2017   Feng
(Continued)

FOREIGN PATENT DOCUMENTS

CN     104726726 A  *   6/2015
CN     110340352         10/2019
(Continued)

OTHER PUBLICATIONS

Zhang, Yang, et al. "Preparation and rheo-squeeze casting of semi-solid AZ91-2 wt% Ca magnesium alloy by gas bubbling process." Journal of Materials Research 30.6 (2015): 825-832. (Year: 2015).*

(Continued)

*Primary Examiner* — Jophy S. Koshy
*Assistant Examiner* — Joshua S Carpenter
(74) *Attorney, Agent, or Firm* — Snell & Wilmer L.L.P.

(57) ABSTRACT

A method may comprise: placing a probe in a molten metal melt comprising a thixotropic metal alloy; injecting a gas into the molten metal melt to form a saturated slurry, the saturated slurry being at a temperature above a liquidus temperature of the thixotropic metal alloy after injecting the gas; removing the probe from the molten metal melt; and depositing the molten metal melt through an extruder of an additive manufacturing system.

7 Claims, 8 Drawing Sheets

(51) Int. Cl.
*B33Y 30/00* (2015.01)
*B23K 20/12* (2006.01)
*B22F 12/70* (2021.01)

(56) References Cited

U.S. PATENT DOCUMENTS

| | | |
|---|---|---|
| 2018/0272401 A1* | 9/2018 | Lacaze .................... B21C 33/02 |
| 2019/0255615 A1 | 8/2019 | Liang |
| 2021/0101330 A1 | 4/2021 | Hikmet |

FOREIGN PATENT DOCUMENTS

| | | |
|---|---|---|
| DE | 102019002203 | 7/2020 |
| WO | 2020192815 | 10/2020 |

OTHER PUBLICATIONS

Espacenet machine translation of CN-104726726-A retrieved on Jan. 28, 2023 (Year: 2015).*
Palanivel, S., et al. "Friction stir additive manufacturing for high structural performance through microstructural control in an Mg based WE43 alloy." Materials & Design (1980-2015) 65 (2015): 934-952. (Year: 2015).*
European Patent Office, European Search Report dated Dec. 5, 2022 in Application No. 22188841.5.

* cited by examiner

SYSTEMS AND METHODS FOR DIRECT DEPOSITION OF THIXOTROPIC ALLOYS

FIELD

The present disclosure relates generally to additive manufacturing systems and methods systems and methods and, more particularly, to systems and methods for direct deposition of thixotropic alloys.

BACKGROUND

Directed energy deposition (DED) fusion in relation to additive manufacturing technology utilize powder or wire feedstocks. Non-fusion binder jetting and metal injection molding (MIM) related additive manufacturing technologies utilize feedstock prepared by mixing powders with polymer based binders to produce pellets or filaments. These typical additive manufacturing process have limitations in terms of typically being unable to produce microstructure properties to a similar degree with wrought alloy metals. These typical additive manufacturing process have difficulty achieving high deposition rates and often result in extensive post processing operations to improve the microstructure properties of the component being manufactured.

SUMMARY

A method is disclosed herein. The method may comprise: placing a probe in a molten metal melt comprising a thixotropic metal alloy; injecting a gas composition including an inert gas and an interstitial gas into the molten metal melt to form a saturated slurry, the saturated slurry being at a temperature above a liquidus temperature of the thixotropic metal alloy after injecting the gas composition; removing the probe from the molten metal melt; and depositing the molten metal melt through an extruder of an additive manufacturing system.

In various embodiments, the method further comprises depositing a fiber with the molten metal melt to form a metal matrix composite. The fiber may be a metal coated carbon fiber. The temperature may be between 1% and 20% above the liquidus temperature of the thixotropic metal alloy. The method may further comprise depositing a plurality of layers in a build direction, wherein a deposition temperature of each layer in the plurality of layers is determined based on creating a predetermined solid to liquid ratio between layers. The method may further comprise friction stir welding the plurality of layers together. The gas may be injected through at least one of the probe and a nozzle of an extruder in the additive manufacturing system. The gas composition may further comprise a plurality of interstitial gases including the interstitial gas, the gas composition configured to promote oxide strength of the thixotropic metal alloy.

An additive manufacturing system is disclosed herein. The additive manufacturing system may comprise: an extruder including a shot sleeve defining a cavity, an inlet duct in fluid communication with the cavity, a screw feeder disposed at least partially within the shot sleeve, and a nozzle, the screw feeder configured to rotate causing a molten metal melt to translate towards and out the nozzle; a crucible configured to receive the molten metal melt, the crucible configured to be in fluid communication with the cavity during deposition; and a probe configured to actuate into and out of the crucible.

In various embodiments, the nozzle is a heated nozzle. The shot sleeve may be a heated shot sleeve. The molten metal melt may include a thixotropic metal alloy having a melting temperature between 2,000° F. (1093° C.) and 4,000° F. (2,204° C.). The additive manufacturing system may further comprise a spool fiber feeder coupled to the extruder, the spool fiber feeder configured to feed a fiber into a deposited layer from the nozzle during deposition. The additive manufacturing system may further comprise a mechanical arm and a controller in operable communication with the mechanical arm, the extruder, the crucible, and the probe. The controller may be configured to command the crucible to heat to a temperature above a liquidus temperature of the molten metal melt prior to deposition, wherein the molten metal melt is a thixotropic metal alloy having a melting temperature between 2,000° F. (1093° C.) and 4,000° F. (2,204° C.).

A control system for an additive manufacturing system is disclosed herein. The control system may comprise: a probe actuator configured to actuate a probe into and out of a crucible; a gas valve; a feeder valve; a screw feeder motor of an extruder; and a controller in operable communication with the probe actuator, the gas valve, and the screw feeder motor, the controller configured to: command the probe actuator to actuate into the crucible, the crucible configured to hold a molten metal melt; command the gas valve to open; command the gas valve to close after a predetermined quantity of interstitial gas is released; command the probe actuator to actuate the probe out of the crucible; command the feeder valve to open, fluidly coupling the crucible to the extruder; and command the screw feeder motor to rotate a screw feeder and deposit the molten metal melt.

The control system may further comprise a spool feeder motor configured to feed a fiber during depositing the molten metal melt. The controller may further be configured to control a speed that a spool feeder is deposited via the spool feeder motor. The control system may further comprise a heating device coupled to a nozzle, the controller configured to control a deposit temperature of the molten metal melt. The controller may further comprise a mechanical arm in operable communication with the controller. The mechanical arm may be a 6-axis robot arm.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Typical thixotropic technology includes preheating a material below a liquidus point (i.e., between its liquidus and solidus temperature). Typical thixotropic technology may include a slurry that is between 30 and 65% solid by volume. The semi-solid slurry used in typical thixotropic technology is utilized in casting processes. Typical thixotropic technology is primarily used in die casting. Typically, the material is heated below the liquidus point to have a smaller grain size, dimensional accuracy, and solidification defects. When utilizing molten metal, if molten metal is poured into a mold above the liquidus point, the die casting may result in undesirably excessive shrinkage, hot shearing, and/or solidification cracking due to a gravity or a vacuum assist. Thus, thixotropic technology tends to discourage preheating a material above a liquidus point. The limitations of thixotropic technology though is it is only useful in low-melting alloys (e.g., aluminum ($T_m$=1221° F. [660° C.]) and magnesium ($T_m$=1202° F. [660° C.]). In contrast, the methods and systems disclosed herein can be used for additive manufacturing of higher melting point metal materials (e.g., titanium alloy Ti6Al4V ($T_m$=3020° F. [1660° C.]), stainless steel alloys ($T_m$=2750° F. [1510° C.]), nickel alloys ($T_m$=2647° F. [1453° C.]), etc.).

Disclosed herein are systems and methods of utilizing a gas induced semi-solid (GISS) technique with thixotropic alloys where the thixotropic alloy is melted slightly above a liquidus point and an inert gas is injected into the liquidus metal. In this regard, the inert gas may enable a superheated slurry that maintains the condition for a much longer time than a conventionally prepared slurry (e.g., a slurry prepared as outlined above), which may be beneficial for maintaining the slurry condition for not only low melting point alloys, but also for titanium, stainless steel, nickel, and cobalt based super alloys (i.e., aerospace grade metal alloys), in accordance with various embodiments.

In various embodiments, disclosed herein are methods and systems utilizing injection of pre-determined gas composition. The pre-determined gas composition may facilitate creating a solid nuclei which may serve as a center of crystallization that suppress grain growth and provide improved mechanical properties for the extruded component. In various embodiments, the predetermined gas composition may include an inert gas with an addition of interstitial gases (e.g., oxygen gas, nitrogen gas, carbonaceous gas, and/or hydrogen gas). In various embodiments, the addition of the interstitial gases can strengthen the metal alloy (e.g., titanium alloys or similar metal alloys) and may facilitate a solid solution strengthening mechanism.

In various embodiments, a method for direct energy deposition (DDP) of thixotropic alloys is disclosed herein. "Thixotropic alloys" as disclosed herein are metal alloys that are configured to flow when sheared but thicken when standing. In various embodiments, the method comprises a gas induced semi-solid (GISS) technique utilized in the three-dimensional printing (or "additive manufacturing) process. The method comprises placing a diamond probe into a molten metal to remove a controlled amount of heat, injecting the pre-determined gas composition to the melt, rapidly removing the diamond probe from the molten melt, and depositing resultant molten melt through an extruder of a three-dimensional printing system. The method further includes incorporation of a continuous metal coated fiber (e.g., a carbon fiber) into the deposited layer and controlling a solid to liquid ration as described further herein. Injection of the predetermined gas composition may assure controlled and uniform cooling of the molten melt to a temperature slightly above a liquidous temperature, create a solid nuclei of the molten melt, and facilitate a solid solution strengthening mechanism. In this regard, with the addition of the interstitial gases combination, the pre-determined gas composition may facilitate a greater strength in the solid solution relative to typical additive manufacturing systems and process, resulting in less material to meet strength standards, and more robust product manufacturing, in accordance with various embodiments. The diamond probe may be removed upon reaching a desired solid fraction.

The precisely controlled solid to liquid ratio may facilitate the use of friction stir additive manufacturing (FSAM) systems, in accordance with various embodiments.

In various embodiments, the systems and methods disclosed herein enable solid solution strengthening in additive manufacturing processes via inert gas mixing with a controlled addition of interstitial gases. An "interstitial gas" as disclosed herein refers to gases that are present in an intergranular space of the subsoil, such as oxygen, nitrogen, carbon, and hydrogen atoms. The interstitial gas may strengthen metal alloys, such as titanium alloys or the like, in accordance with various embodiments. In various embodiments, the interstitial gas may be configured to promote oxide strength in the additively manufactured component. For example, oxygen or nitrogen, carbon, and hydrogen may promote strength in a titanium alloy or the like.

Figure 1:
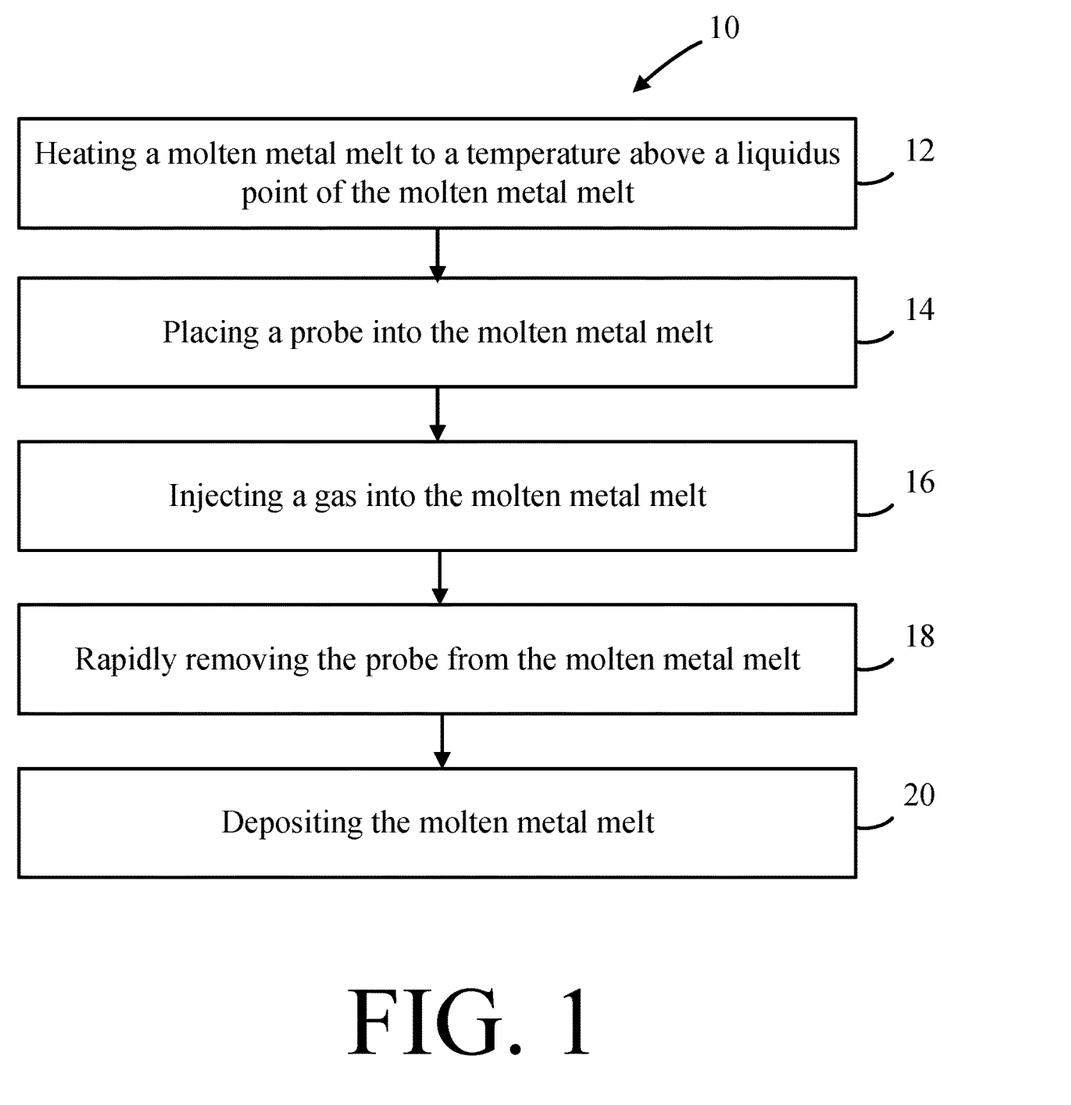
FIG. 1 illustrates a process for direct deposition of thixotropic alloys, in accordance with various embodiments.

Referring now to FIG. 1, a process of using an additive manufacturing system is illustrated, in accordance with various embodiments. The process 10 comprises heating a molten metal melt to a temperature above a liquidus point of the molten metal melt, such that approximately 100% of the molten metal melt is a liquid. In various embodiments, the molten metal melt may be heated in a crucible, a ladle, or the like of the additive manufacturing system. In various embodiments, the molten metal melt is a metal alloy having a high melting temperature. A "high melting temperature," as disclosed herein is a melting temperature between 2,000° F. (1093° C.) and 4,000° F. (2,204° C.) or between 2,200° F. (1,204° C.) and 3,600° F. (1,982° C.), or between 2,500° F. (1,371° C.) and 3,300° F. (1,815° C.). In various embodiments, the process disclosed herein is further applicable to low melting temperatures as well. Thus, the melting temperatures may be between 572° F. (300° C.) and 4,000° F. (2,204° C.), in accordance with various embodiments.

Figures 4A, 4B:
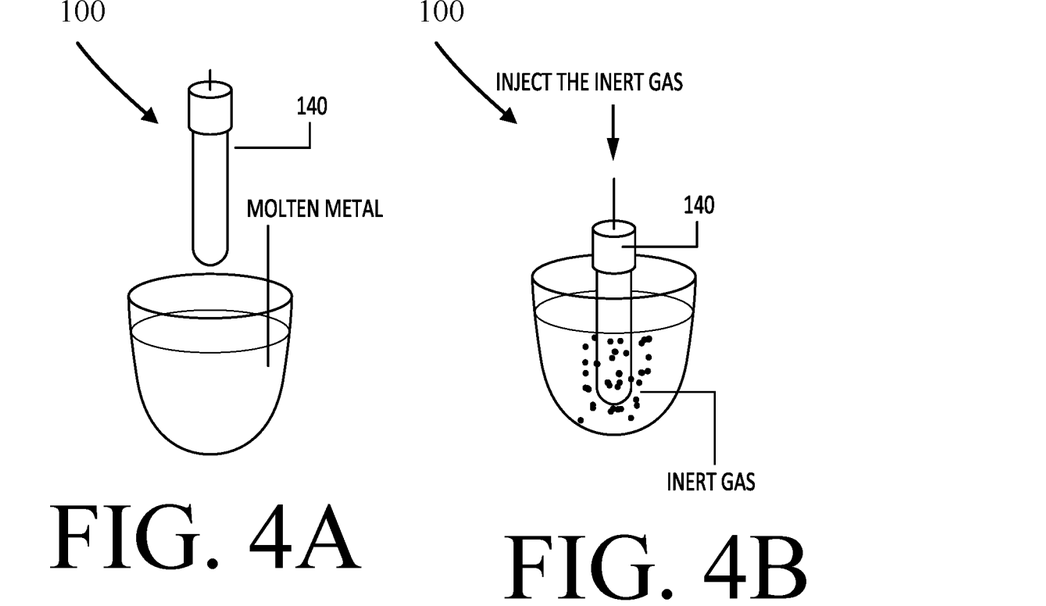
FIGS. 4A, 4B, 4C and 4D illustrate the process of FIG. 1, in accordance with various embodiments.

The process 10 further comprises placing a probe into a molten metal melt (step 14). As illustrated in FIG. 4A, the probe may be placed via the additive manufacturing system 100. In this regard, the additive manufacturing system may include a controller operable to insert and remove the probe 140 from a molten metal melt (e.g., via an electrically controlled actuator or the like). The probe 140 may comprise a diamond probe and configured to remove a controlled amount of heat from the molten metal melt.

The process 10 further comprises injecting a pre-determined gas composition into the molten metal melt as illustrated in FIG. 4B (step 16). In this regard, the pre-determined gas composition are applied to the molten metal melt to assure a controlled and uniform cooling of the melt to a temperature slightly above a liquidus temperature and/or create a solid nuclei, in accordance with various embodiments. The pre-determined gas composition may be injected via the additive manufacturing system 100 through the probe 140, through a nozzle of an extruder 120, through a shot sleeve of an extruder 120, or the like. In this regard, the controller may be configured to actuate a valve open and release the inert gas bubbles into the molten metal melt as described further herein. In various embodiments, the predetermined gas composition being injected is a predetermined gas composition configured to promote oxide strength of the component being manufactured. In various embodiments, the predetermined gas composition may vary based on a material of the molten metal melt. In various embodiments, the predetermined gas composition may include oxygen gas, nitrogen gas, carbonaceous gas, and/or hydrogen gas. In various embodiments, for a titanium alloy molten melt as described previously herein, the predetermined gas composition may include one of oxygen or nitrogen, carbon, and hydrogen. In various embodiments, oxygen or nitrogen may be injected first, followed by carbon, followed by hydrogen. In various embodiments, proportions of each gas may be determined based on a desired characteristic of the deposited molten metal melt in step 20 of process 10.

In various embodiments, by injecting the predetermined gas composition in step 16 to the slurry after step 14, the resultant slurry may be a saturated slurry at a temperature above the liquidus point of the molten metal melt. In this regard, the resultant slurry may remain in a moldable form for a longer duration of time relative to typical additive manufacturing deposition systems, in accordance with various embodiments. In various embodiments, the resultant slurry is between 1% and 20% above the liquidous point of the molten metal melt, or between 2% and 10% above the liquidus point of the molten metal melt.

Figure 4C:
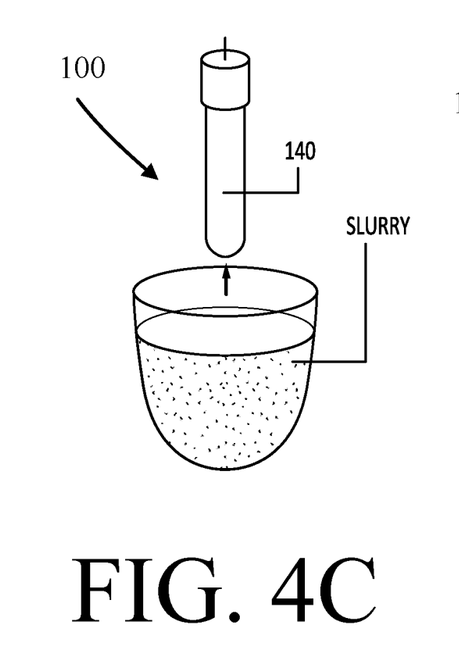
Figure 4D:
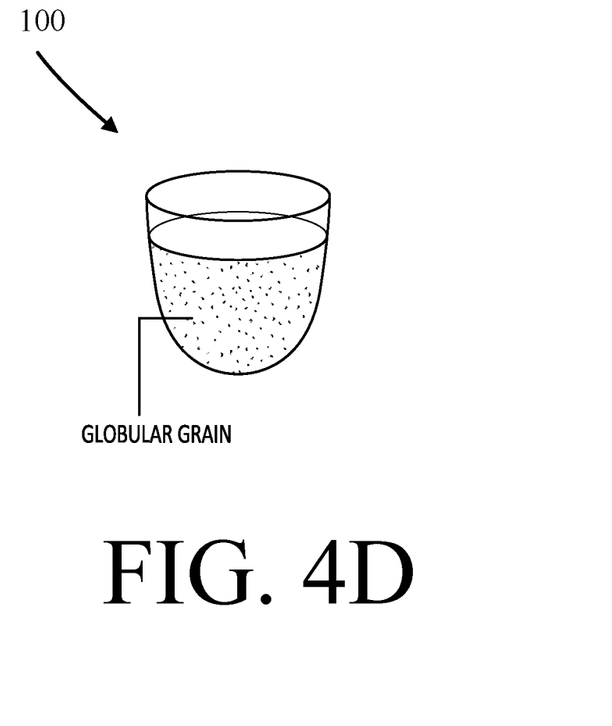

The process 10 further comprises rapidly removing the probe from the molten metal melt as illustrated in FIG. 4C (step 18). The probe 140 may be removed as commanded by the controller of the additive manufacturing system 100. The probe 140 may be removed in response to a desired solid fraction (i.e., relative density=envelope density of the molten metal melt/true density of the solid metal).

The process further comprises depositing, via the additive manufacturing system, the molten metal melt (step 20). The additive manufacturing system comprises an extruder in fluid communication with the crucible, or ladle holding the molten metal (e.g., via an inlet or the like). The extruder may include a shot sleeve and a removable nozzle. In various embodiments, the shot sleeve and the removable housing may be heated to provide a controlled temperature of the molten melt through the depositing step 20 as described further herein.

In various embodiments, the process 10 may comprise additional process enhancements, such as argon-based cooling of a deposited layer, deep rolling (e.g., cold work deformation and burnishing), or laser shot peening (i.e., reducing distortion by preheating via selective laser melting (SLM)).

Figure 7:
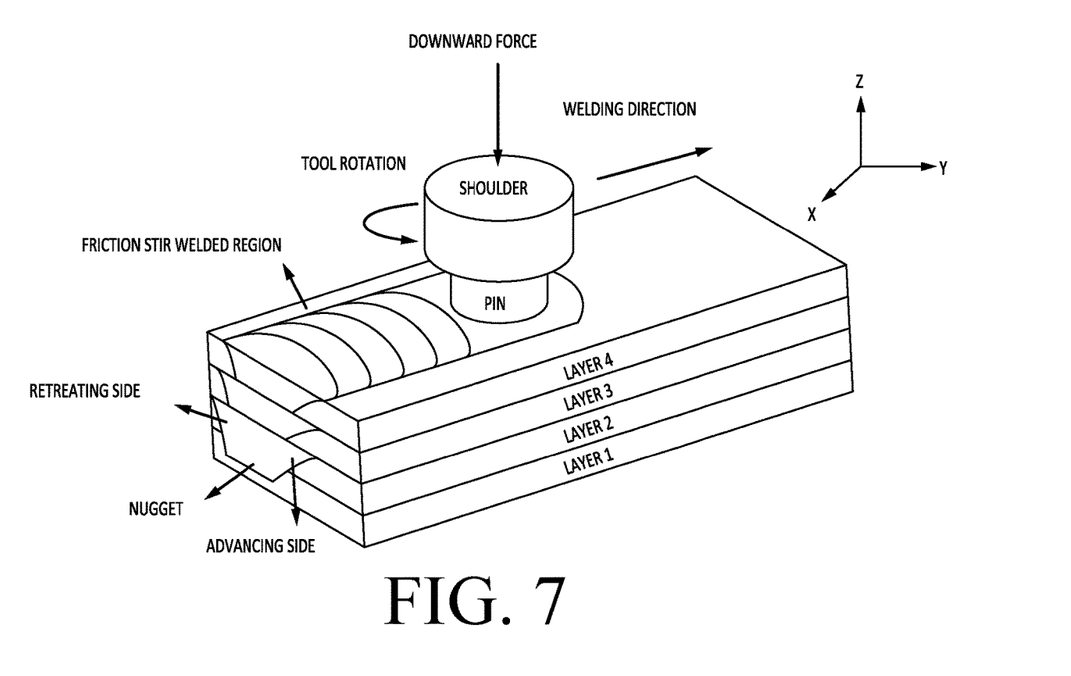
FIG. 7 illustrates a friction stir additive manufacturing process, in accordance with various embodiments.

In various embodiments, the process 10 may further comprise depositing several layers in accordance with step 20. In this regard, a resultant component may be built up in a vertical direction. In various embodiments, the process may enable a precise shift of solid to liquidus point between layers. For example, the lowest layer (i.e., the furthest (or most distal) layer from a layer being deposited) may be the most liquidus and the top layer (i.e., a layer being deposited) may be the least liquidus (i.e., most solidus), which may enable a friction stir additive manufacturing process to provide greater adhesion between layers (e.g., depositing a final layer under pressure by rotating a tool as illustrated in FIG. 7).

Figure 2A:
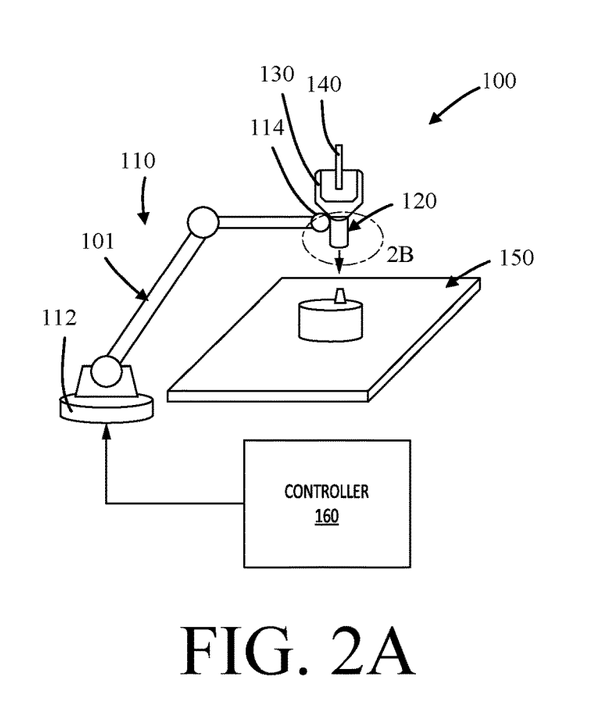
FIG. 2A illustrates a perspective view of a manufacturing system, in accordance with various embodiments.

Referring now to FIG. 2A, a perspective view of a manufacturing system 100 configured to manufacture a 3D component in accordance with process 10 from FIG. 1, is illustrated in accordance with various embodiments. The manufacturing system 100 may comprise a mechanical arm 110, an extruder 120, a crucible 130, a probe 140, and a build plate 150, and a controller 160. In various embodiments, the mechanical arm 110 extends from a fixed end 112 to a moveable end 114. The extruder 120 is coupled to the moveable end 114 and configured to move with the moveable end 114. In various embodiments, the mechanical arm 110 is in electrical (or wireless) communication with a controller configured to control a position of the mechanical arm 110 during additive manufacturing in accordance with process 10 from FIG. 1 as described further herein. In this regard, the mechanical arm 110 may comprise a 6-axis robotic arm, in accordance with various embodiments. Although illustrated as a six axis robotic arm, the mechanical arm 110 is not limited in this regard. For example, a three-axis gantry system is within the scope of this disclosure.

In various embodiments, the extruder 120 is disposed at the distal end of the mechanical arm 110. With reference now to FIG. 2A, the extruder 120 may comprise a removable nozzle 210, a screw feeder 220, a shot sleeve 230, and an inlet duct 240. In various embodiments, the removable nozzle 210 is a heated removable nozzle (e.g., via a heater block 212 or the like). In various embodiments, heating of the removable nozzle 210 is controlled by the controller 160 from FIG. 2A. In various embodiments, the removable nozzle 210 described herein may be one of a plurality of removeable nozzles with varying exit diameters, so the removable nozzles of the additive manufacturing system 100 from FIG. 2A may enable a higher deposition rate and/or an improved surface finish and feature resolution relative to typical additive manufacturing systems.

Figure 2B:
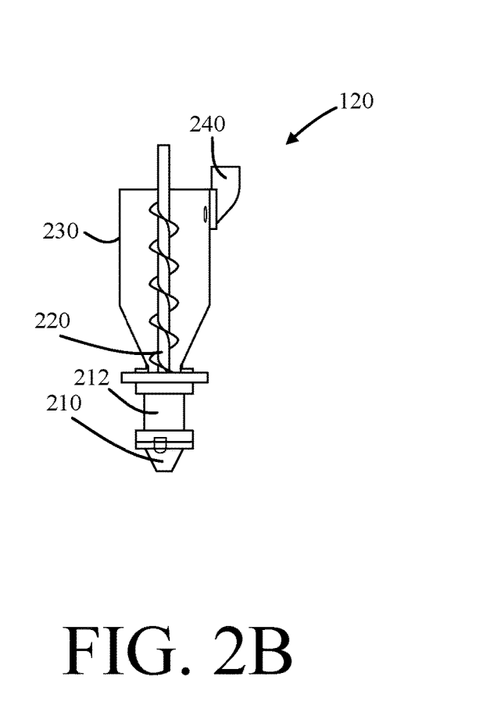
FIG. 2B illustrates a cross-sectional view of an extruder for a manufacturing system, in accordance with various embodiments.

The screw feeder 220 extends axially through the shot sleeve 230 defining an axis of the extruder 120. The screw feeder 220 is electrically coupled to a motor in operable communication with the controller 160 as described further herein. The screw feeder 220 is configured to rotate about the axis defined by the screw feeder 220 and translate the molten metal melt through the shot sleeve 230 and out the removable nozzle 210, in accordance with various embodiments.

The shot sleeve 230 at least partially houses the screw feeder 220 and is configured to house the molten metal melt throughout a depositing step (e.g., step 20 from process 10 of FIG. 1). In various embodiments, the shot sleeve 230 is also heat controlled in a manner similar to the removable nozzle 210. In various embodiments, the shot sleeve 230 and the removable nozzle 210 may be heated independently or together. The present disclosure is not limited in this regard.

With combined reference to FIGS. 2A and 2B, the inlet duct 240 extends from the crucible 130 to a cavity defined by the shot sleeve 230. In this regard, the crucible 130 may feed the inlet duct of 240 of the extruder 120 during a depositing step 20 of process 10 from FIG. 1, in accordance with various embodiments. In this regard, the crucible 130 may include a valve, or the like, configured to open in response to starting a depositing step (e.g., when the molten melt reaches a desired solid fraction in step 18 of process 10 from FIG. 1.

In various embodiments, the manufacturing system 100 includes at least one heating device configured to heat the crucible to a predetermined temperature in accordance with step 12 of process 10 from FIG. 1. In various the crucible 130 is integral with a heating device (e.g., the crucible 130 may include a hot plate as a part of its construction and operable through controller 160). In various embodiments, the crucible 130 comprises an induction coil configured to control the temperature of the molten metal melt during process 10 of FIG. 1. In this regard, the controller 160 is configured to command heating to a predetermined temperature based on a molten metal alloy being deposited in accordance with step 20 of process 10 of FIG. 1.

In various embodiments, the probe 140 is configured to be inserted into a cavity defined by the crucible 130 during step 14 of the process 10 and removed from the cavity defined by the crucible 130 during step 18 of the process 10. In various embodiments, the crucible 130 is coupled to the extruder 120. In various embodiments, the extruder 120 may be configured to engage the crucible 130 for a feeding step and disengage from the crucible during a depositing step (e.g., step 20 from process 10 of FIG. 1). The present disclosure is not limited in this regard. In various embodiments, the build plate 150 may be configured to move relative to the mechanical arm 110 or the build plate 150 may remain stationary during a depositing step (e.g., step 20 from process 10 of FIG. 1). The present disclosure is not limited in this regard.

Figure 8:
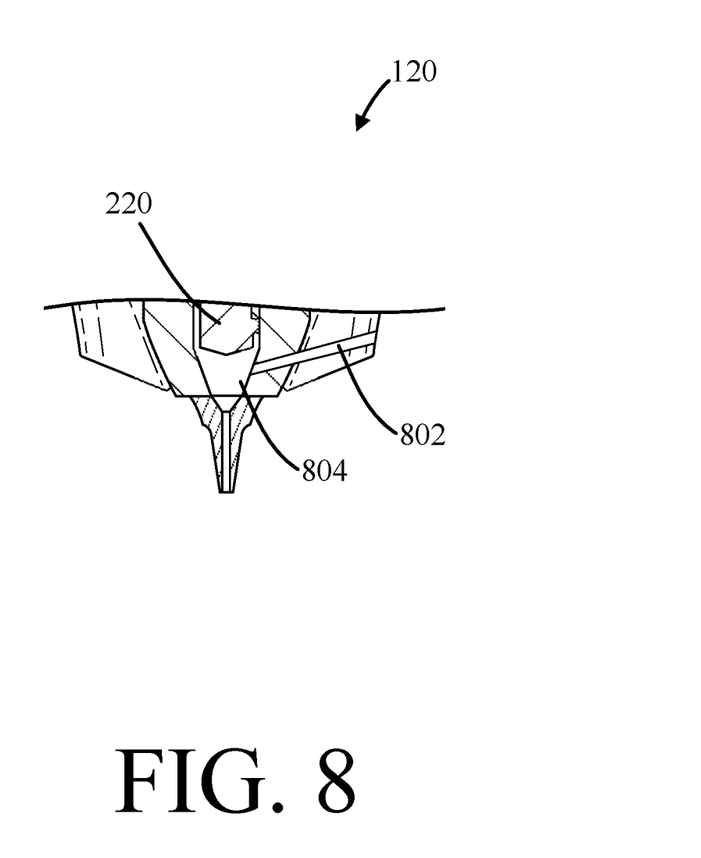
FIG. 8 illustrates a cross-sectional view of a nozzle of an extruder, in accordance with various embodiments.

In various embodiments, the probe 140 comprises a fluid port disposed therethrough (as illustrated in FIGS. 4A-D) and in fluid communication with a gas source as described previously herein. In this regard, the injecting the gas into the molten melt of step 16 from process 10 may be done through the probe in accordance with various embodiments. However, the present disclosure is not limited in this regard. For example, with brief reference to FIG. 8, a nozzle 210 of an extruder 120 may comprise a gas port 802 and a molten melt port 804. The molten melt port 804 may be configured to receive the molten melt during process 10 from FIG. 1 from the screw feeder 220 or the like. The gas port 802 may be in fluid communication with a gas source, in accordance with various embodiments as described previously herein. In various embodiments, the gas port 802 in the nozzle 210 and a fluid port in the probe 140 may also be used in combination to inject the predetermined composition in multiple locations (i.e., at the nozzle, at the probe, and/or in any other location desirable). In various embodiments, the predetermined gas composition may be injected in a single location (i.e., at the nozzle, at the probe, and/or in any other location desirable).

Figure 3:
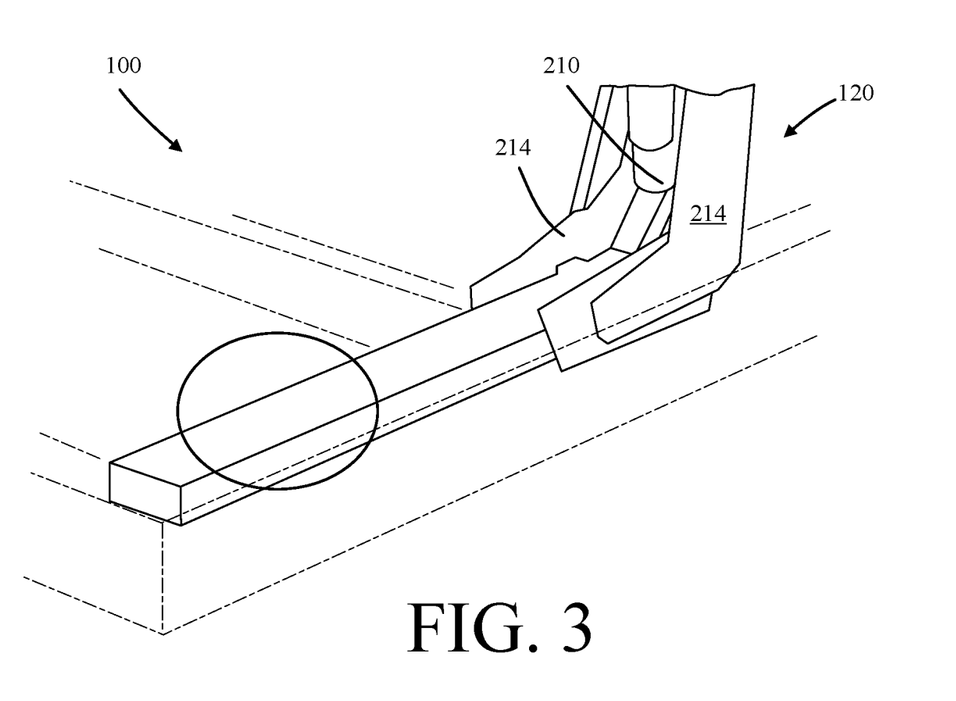
FIG. 3 illustrates a manufacturing system in use, in accordance with various embodiments.

Referring now to FIG. 3, a perspective view of the manufacturing system 100 from FIG. 2A in use is illustrated in accordance with various embodiments. In various embodiments, the extruder 120 may comprise various attachments 214 configured to control a profile of a deposited layer. For example, the attachments 214 may comprise wall forming attachments configured to define vertical walls of the deposited layer as illustrated. Any attachment configured to mold a profile a deposited layer is within the scope of this disclosure.

Figure 5:
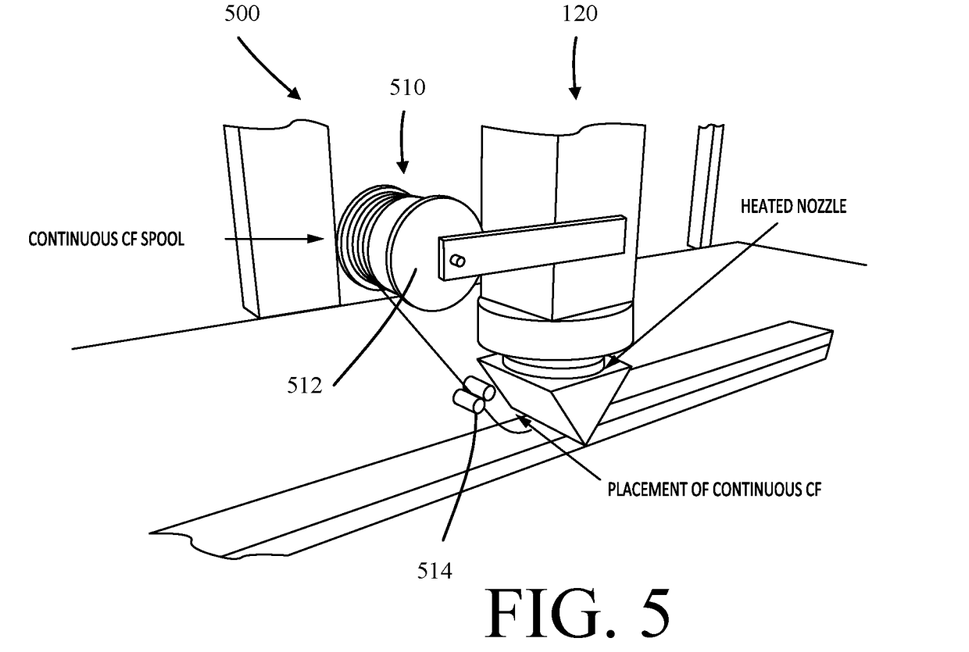
FIG. 5 illustrates a perspective view of a manufacturing system, in accordance with various embodiments.

Referring now to FIG. 5, a perspective view of a manufacturing system 500 is illustrated, in accordance with various embodiments. The manufacturing system 500 is in accordance with the manufacturing system 100 with the addition of a fiber spool feeder 510. In various embodiments, the fiber spool feeder 510 is configured to feed carbon fiber, or the like into a deposited layer from extruder 120. In this regard, the process 10 from FIG. 1 facilitates creating a metal matrix composite having a thixotropic metal alloy with a high melting temperature and a carbon fiber or a metal coated carbon fiber, in accordance with various embodiments. For example, since the resultant slurry from steps 12-18 of process 10 from FIG. 1 is maintained in a lesser condition relative to typical thixotropic techniques outlined previously herein, the fiber may be introduced into a deposited layer during step 20 of process 10 from FIG. 1, in accordance with various embodiments.

In various embodiments, injecting the predetermined gas composition in step 16 of process 10 from FIG. 1 may shut of crystallization, allowing the resultant slurry to remain in a superheated condition for an extended period of time relative to typical systems and methods. By remaining in the superheated condition for the extended period of time, the carbon fiber may be placed during depositing and become embedded within the component being manufactured via the manufacturing system 500. In various embodiments, by creating a metal matrix composite as disclosed herein, compression, tension, torque, bending, and/or any other strength conditions may be significantly improved and/or result in a lower weight composite, which may be significant for aerospace applications.

In various embodiments, the fiber spool feeder 510 comprises a spool 512 configured to rotate about a spool axis and pinch rollers 514. In various embodiments, the pinch rollers 514 include a drive motor configured to drive the fiber during a depositing step 20 of process 10 from FIG. 1.

Figure 6:
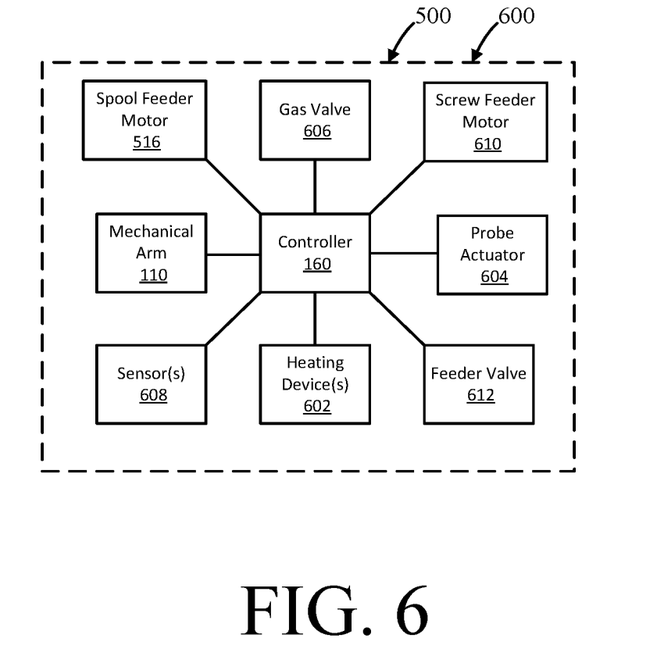
FIG. 6 illustrates a schematic view of a control system for a manufacturing system, in accordance with various embodiments.

Referring now to FIG. 6, a schematic view of a control system 600 for a manufacturing system 500 is illustrated, in accordance with various embodiments. The control system 600 comprises the controller 160, the mechanical arm 110, heating device(s) 602, probe actuator 604, screw feeder motor 610, spool feeder motor 516, and/or sensor(s) 608. In various embodiments, controller 160 may be integrated into a microcontroller disposed within the additive manufacturing device 101 from FIG. 2A. In various embodiments, controller 160 may be configured as a central network element or hub to access various systems and components of manufacturing system 500. Controller 160 may comprise a network, computer-based system, and/or software components configured to provide an access point to various systems and components of manufacturing system 500. In various embodiments, controller 160 may comprise a processor. In various embodiments, controller 160 may be implemented in a single processor. In various embodiments, controller 160 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 160 may comprise a processor configured to implement various logical operations in response to execution of instructions, for example, instructions stored on a non-transitory, tangible, computer-readable medium configured to communicate with controller 160.

In various embodiments, the controller 160 is in operable communication with the mechanical arm 110. In this regard, the controller 160 may be configured to command the mechanical arm 110 to deposit the resultant slurry from process 10 of FIG. 1 in predetermined locations based on a geometry of a respective component being additively manufactured.

In various embodiments, the controller 160 is in operable communication with heating device(s) 602. For example, a heating device(s) 602 may include an inductive coil integral with the crucible 130 from FIG. 2A, a heating device configured to heat the removable nozzle 210 of the extruder 120 in FIG. 2B, and/or a heating device of shot sleeve 230 from FIG. 2B, in accordance with various embodiments. In this regard the heating device(s) 602 may control a temperature of the molten metal throughout process 10 from FIG. 1.

In various embodiments, the controller 160 is in operable communication with a probe actuator 604. The probe actuator 604 may be configured to actuate the probe 140 from FIG. 2A into and out of the crucible 130 during process 10 from FIG. 1, in accordance with various embodiments.

In various embodiments, the controller 160 is in operable communication with a gas valve 606. The gas valve 606 may control fluid from a gas tank to an outlet disposed on the probe 140 from FIG. 2A. In this regard, in response to the controller 160 commanding the gas valve 606 to open, an inert interstitial gas may be release into the molten metal melt in accordance with step 16 of process 10 from FIG. 1.

In various embodiments, the controller 160 is in operable communication with sensor(s) 608. In this regard, the manufacturing system 500 may include various sensors. For example, each motor may include a speed sensor, each component that is being heated may include a temperature sensor, a temperature sensor may be disposed in the molten metal melt (or configured to determine a temperature in the molten metal melt) or the like. In this regard, the control system 600 may include a feedback system where controller 160 can a adapt a temperature of a heating device based on a temperature sensor output or adapt a motor speed based on speed sensor output, in accordance with various embodiments.

In various embodiments, the controller 160 is in operable communication with the screw feeder motor 610. In various embodiments, the screw feeder motor 610 drives the screw feeder 220 of FIG. 2B during a depositing step (e.g., step 20) of process 10 from FIG. 1.

In various embodiments, the controller 160 is in operable communication with the spool feeder motor 516. The spool feeder motor 516 is configured to drive the pinch rollers 514 of the fiber spool feeder 510 from FIG. 5. In this regard, a rate of deposition of the fiber may be controlled, in accordance with various embodiments.

In various embodiments, the control system 600 further comprises a feeder valve 612. The feeder valve 612 is a valve configured to control flow between the crucible 130 and the extruder 120 from FIG. 2A. In this regard, in response to opening the feeder valve 612, a cavity of the crucible 130 may become in fluid communication with a cavity of the extruder 120, in accordance with various embodiments.

In various embodiments, the systems and methods disclosed herein may result in cycle time reduction relative to typical additive manufacturing systems. For example, with less heat content of a predetermined solid fraction melt, solidification may occur more quickly, allowing a slurry injection speed to be increased, in accordance with various embodiments. Additionally, the process 10 from FIG. 1 may facilitate less cooling time via inert gas or air blow due to the reduced solidification time, in accordance with various embodiments. Reduction in cycle time may result in improved productive and less production cost, in accordance with various embodiments.

In various embodiments, production cost for aerospace grade components may be reduced via the processes and systems disclosed herein. For example, the removable nozzle 210 may have significant life extension since the nozzle assembly may be exposed to less heat content relative to a superheated liquid metal, in accordance with various embodiments. The lower temperature difference may facilitate extended nozzle life and result in reduced maintenance costs, in accordance with various embodiments. Nozzles and attachments disclosed herein may facilitate improved surface finish and minimize post build machining allowances, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   placing a probe in a molten metal melt comprising a thixotropic metal alloy;
   injecting a gas composition including an inert gas and an interstitial gas into the molten metal melt to form a saturated slurry, the saturated slurry being at a temperature above a liquidus temperature of the thixotropic metal alloy after injecting the gas composition;
   removing the probe from the molten metal melt;
   depositing the molten metal melt through an extruder of an additive manufacturing system;
   depositing a plurality of layers in a build direction; and
   friction stir welding the plurality of layers together.

2. The method of claim 1, further comprising depositing a fiber with the molten metal melt to form a metal matrix composite.

3. The method of claim 2, wherein the fiber is a metal coated carbon fiber.

4. The method of claim 1, wherein the temperature is between 1% and 20% above the liquidus temperature of the thixotropic metal alloy, and wherein the thixotropic metal alloy has a melting temperature between 2,000° F. (1093° C.) and 4,000° F. (2,204° C.).

5. The method of claim 1, wherein a deposition temperature of each layer in the plurality of layers is determined based on a solid to liquid ratio between layers.

6. The method of claim 1, wherein the gas composition is injected through at least one of the probe and a nozzle of the extruder in the additive manufacturing system.

7. The method of claim 1, wherein the gas composition further comprises a plurality of interstitial gases, the gas composition configured to strengthen the thixotropic metal alloy.

* * * * *